Fig. I.

Inventors
Henry John James Braddick,
John St Leger Philpot,
By
Roberts B Larson  Attorney Patented Aug. 16, 1949

2,479,304

UNITED STATES PATENT OFFICE 2,479,304

GYROSCOPE

Henry John James Braddick and John St. Leger Philpot, Farnborough, England

Application August 14, 1945, Serial No. 610,796
In Great Britain September 21, 1944

4 Claims. (Cl. 74—5.44)

This invention relates to gyroscopes of the type in which the gyroscope spin axis is brought to and maintained at a predetermined orientation which may be vertical or may be tilted, such a gyroscope being generally called a gyro-vertical.

The object of the present invention is to provide an improved construction and arrangement of parts by which the gyroscope will be caused to precess continuously backwards and forwards about the required predetermined orientation and thus be maintained continuously very close to its predetermined orientation with respect to the vertical.

In one form, described by way of example only, an electrically driven gyroscope has a spindle journalled in the top and bottom cover plates of an enclosing casing which is mounted on gimbals in the usual way. The gyroscope may form a gyro-vertical associated with a bombsight or other navigational instrument, a part of which is stabilised to the vertical and the gyroscope may have a normally vertical or normally tilted spin axis.

The further description of the apparatus is illustrated by the accompanying drawings in which—

Figure 1:
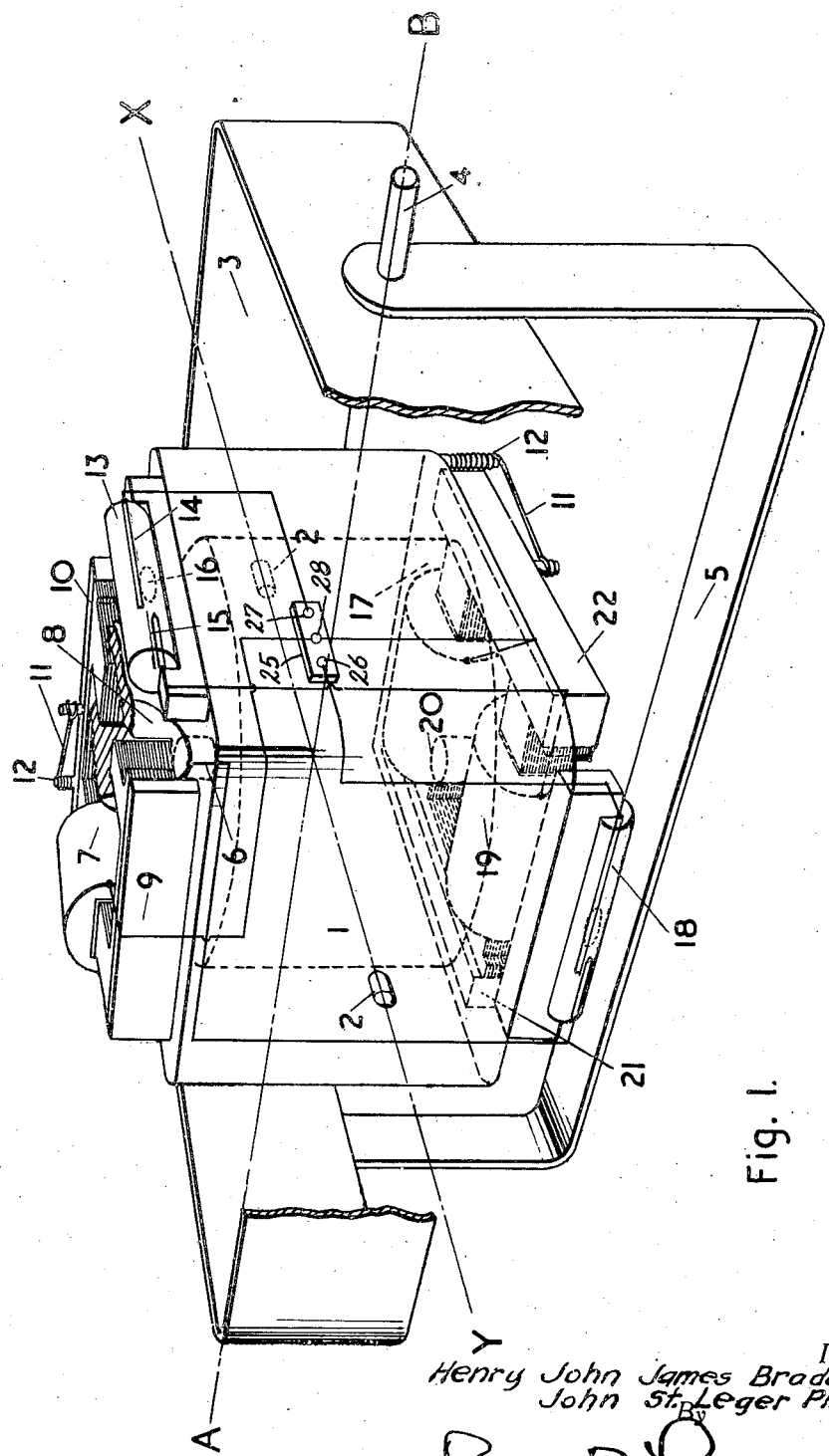
Fig. 1 is a perspective view of a gyroscope according to this invention.

Referring to the drawings, the gyroscope rotor is mounted in a casing 1 which casing is mounted on journals 2 carried by an inner gimbal 3 which is mounted to rotate about the journals 4 carried by an outer gimbal frame 5.

Mounted on the top cover plate 6 of the casing 1 is a solenoid comprising a pair of coils 7, 8 with a U-shaped laminated fixed core 9, the free limbs of which core extend for a short distance into the associated coils. A movable member in the form of a U-shaped core 10 which may be laminated is mounted so that its free ends slide within the coils 7 and 8, leaving an air gap between the opposed ends of the fixed and movable cores. The arrangement is such that when a current is passed through the coils 7 and 8 the member 10 will be moved towards the fixed core 9. To return the member 10, when the current supply to the coils is interrupted, a spring 11 is provided, this spring being coiled around a post 12 anchored to the cover plate 6.

Also mounted on the cover plate 6 is a mercury switch 13. This mercury switch comprises two electrodes 14, 15 and a mercury drop 16.

The bottom cover plate 17 is identical with the top cover plate except that the mercury switch 18 and the coils 19, 20 and the fixed core 21 and the movable core 22 are arranged at right angles to those mounted on the cover plate 6.

Figure 2:
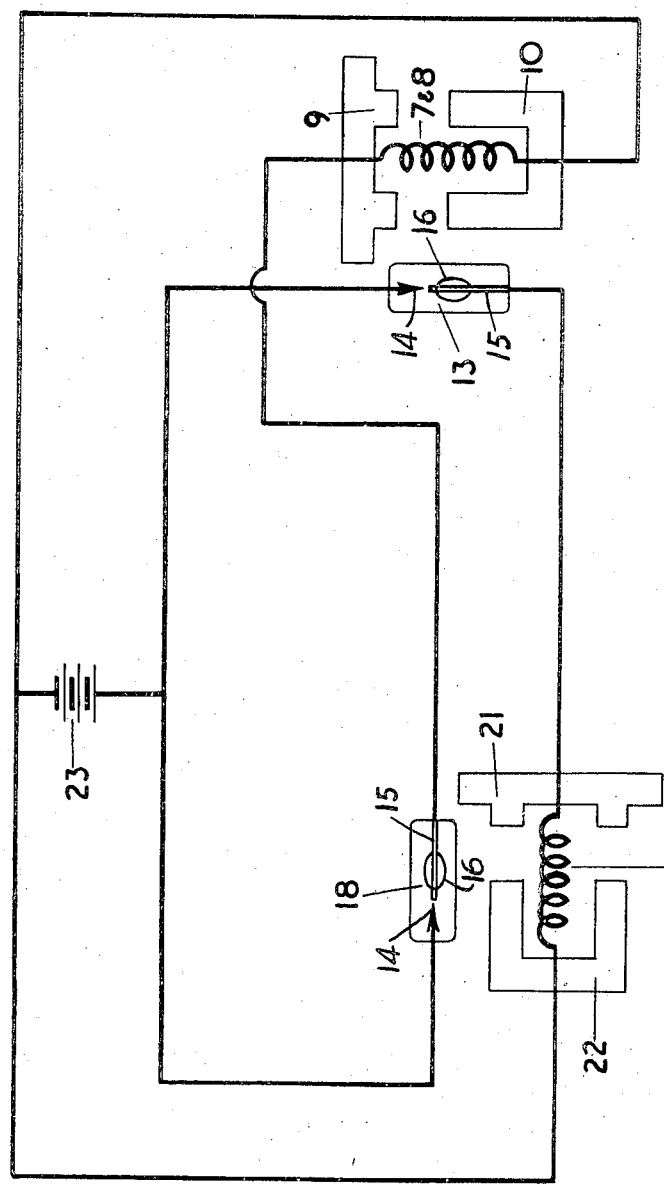
Fig. 2 is a wiring diagram.

Current from a source conventionally represented by the battery 23 (Fig. 2) is supplied to the switches and the magnet coils 7, 8 and 19, 20 by flexible cable (not shown) connected to a terminal block 25 carrying two positive terminals 26, 27 and a negative terminal 28. The terminal 26 is connected to the electrode 14 of switch 18 and electrode 15 of switch 18 is connected through coils 7 and 8 in series back to terminal 28. The terminal 27 is similarly connected to the electrode 14 of switch 13, and the electrode 15 of this switch 13 is connected through the coils 19 and 20 in series back to terminal 28. A wiring diagram is given in Fig. 2. The terminals 14 of both switches 13 and 18 are arranged so that they are always in contact with the mercury drop 16, but the electrodes 15 of these switches only contact the drop 16 when the switch is tilted in one direction.

The mercury switch 13 is responsive to tilting movement of the gyroscope about a tilt axis A—B while the mercury switch 18 is responsive to tilting movement of the gyroscope about the axis X—Y.

In operation therefore, when the gyroscope spin axis tilts to cause either switch to close its associated solenoid circuit the associated movable member will be attracted against its spring into the solenoid coils and the displacement of its mass will destroy the balance of the gyroscope so as to apply to the gyroscope spin axis a torque at right angles to the direction in which it has wandered from its predetermined orientation. This will cause the gyroscope to precess back towards its predetermined orientation and, when it is brought to the required position, the mercury switch will break the circuit to the solenoid and the movable member will return to its normal position so causing the gyroscope spin axis to precess in the opposite direction.

The gyroscope spin axis will thus be caused to precess backwards and forwards through its normal orientation in each direction with an oscillating motion which may conveniently have a period of the order of one second. In this way the gyroscope spin axis will be maintained continuously very close to its predetermined orientation with respect to the vertical.

The gyroscope may, of course, be driven by direct or alternating current and the solenoids may be connected through the mercury switches to the same source of supply as the driving motor.

Preferably, however, alternating current is used because the alternating current will be decreased when the air gap is reduced owing to the increase in inductance. If direct current is used it will be necessary to use a switch actuated by the movable member to reduce the current with reduction in the air gap. Instead of one-way acting mercury switches to control the solenoid, two-way acting mercury switches can be employed to move the armature in each direction. The return spring would then be dispensed with.

What we claim is:

1. In a gyro-vertical the combination of a gyroscope, a case for said gyroscope, a support for universal mounting said case on two gimbal axes at right angles to each other, two masses mounted on said case, one of said masses applying a torque to the gyroscope for precessing the gyroscope and tilting said case about one gimbal axis and the other of said masses applying a torque to the gyroscope for precessing the gyroscope and tilting said case about the other gimbal axis, two tilt actuated switches mounted on said case, one switch closing when the case is tilted by said mass about one axis, and the other switch closing when the case is tilted by said mass about the other axis, each of said switches opening when the case tilts in the opposite direction, means for supplying current to said switches, two electromagnetic devices mounted on said case and connected one to each of said switches to be energised when its switch is closed, each of said devices when energised attracting one of the masses and moving it into a position in which the mass applies an opposite torque to the gyroscope for precessing the gyroscope and tilting its case in the opposite direction to that in which the mass normally tilts it to open the switch and de-energise the electro-magnetic devices, and means for returning each of said masses to its normal position when the electro-magnetic device is de-energised, whereby the masses continuously oscillate and precess the gyroscope backwards and forwards about its predetermined orientation.

2. In a gyro-vertical the combination of a gyroscope including a gyro rotor and a casing for said rotor, a gimbal for universally mounting said gyroscope on two gimbal axes at right angles to each other, two masses mounted on said gyroscope, one of said masses applying a torque to the gyroscope for precessing the gyroscope and tilting it about one gimbal axis, and the other of said masses applying a torque to the gyroscope for precessing the gyroscope and tilting it about the other gimbal axis, two one-way mercury switches mounted on said gyroscope responding to the tilting of the gyroscope about its respective gimbal axes, each switch closing when the gyroscope is tilted in one direction and opening when the gyroscope is tilted in the opposite direction about the appropriate axis, means for supplying current to said mercury switches, two electro-magnetic devices on the gyroscope adjacent to each of said masses and connected in the circuit to each of said switches to be energised when the switch is closed for attracting one of the masses and moving it into a position in which the mass applies an opposite torque to the gyroscope for precessing the gyroscope and tilting it in an opposite direction to that in which it is tilted by the mass in its normal position, thus opening the switch and de-energising the electro-magnetic device, and means for returning each of said masses to their normal position when the electro-magnetic device is de-energised, whereby the masses continuously operate and precess the gyroscope backwards and forwards about its predetermined orientation.

3. In a gyro-vertical the combination of a gyroscope including a gyro rotor and a casing for said rotor, a gimbal for universally mounting said gyroscope on two gimbal axes at right angles to each other, two balance masses, one of said masses being mounted for movement between positions in which it applies opposite torques to the gyroscope for precessing the gyroscope and tilting it in one direction or the other about one gimbal axis depending upon which position the mass occupies, the other mass being mounted for movement having a similar effect relative to the other axis, and means continuously moving said masses between said positions, whereby the masses continuously precess the gyroscope about its predetermined orientation.

4. In a gyro-vertical the combination of a gyroscope including a gyro rotor and a casing for said rotor, a gimbal for universally mounting said gyroscope on two gimbal axes at right angles to each other, two balance masses, one of said masses being mounted for movement between positions in which it applies opposite torques to the gyroscope for precessing the gyroscope and tilting it in one direction or the other about one gimbal axis depending upon which position the mass occupies, the other mass being mounted for movement having a similar effect relative to the other axis, and means including at least one electro-magnet associated with each mass for continuously moving said masses between said positions, whereby the masses continuously precess the gyroscope about its predetermined orientation.

HENRY JOHN JAMES BRADDICK.
JOHN ST. LEGER PHILPOT.

REFERENCES CITED

The following references are of record in the file of this patent:

UNITED STATES PATENTS

| Number | Name | Date |
|---|---|---|
| 1,763,806 | Methvin | June 17, 1930 |
| 2,367,465 | Kunzer | Jan. 16, 1945 |
| 2,368,644 | Curry, Jr. | Feb. 6, 1945 |
| 2,434,488 | Dolude | Jan. 13, 1948 |

FOREIGN PATENTS

| Number | Country | Date |
|---|---|---|
| 371,412 | Italy | Mar. 23, 1939 |